(12) United States Patent
Ramadan et al.

(10) Patent No.: US 12,183,904 B2
(45) Date of Patent: Dec. 31, 2024

(54) VEHICLE BATTERY SYSTEM

(71) Applicant: Karma Automotive LLC, Irvine, CA (US)

(72) Inventors: Nadim F. Ramadan, Irvine, CA (US); Bailey Erin Fagan, Milford, MI (US); Edward Djrbashian, Glendale, CA (US)

(73) Assignee: Karma Automotive LLC, Irvine, CA (US)

( * ) Notice: Subject to any disclaimer, the term of this patent is extended or adjusted under 35 U.S.C. 154(b) by 0 days.

(21) Appl. No.: 18/153,579

(22) Filed: Jan. 12, 2023

(65) Prior Publication Data

US 2023/0170547 A1 Jun. 1, 2023

Related U.S. Application Data

(63) Continuation of application No. 16/814,527, filed on Mar. 10, 2020, now Pat. No. 11,588,199.

(51) Int. Cl.
*H01M 50/20* (2021.01)
*B60L 50/64* (2019.01)
(Continued)

(52) U.S. Cl.
CPC ........... *H01M 10/625* (2015.04); *B60L 50/64* (2019.02); *B60L 58/26* (2019.02); *H01M 10/613* (2015.04);
(Continued)

(58) Field of Classification Search
CPC .. H01M 50/20; H01M 50/209; H01M 50/249; H01M 50/262; H01M 50/00; H01M 50/202; H01M 50/204; H01M 50/271; H01M 2220/20; H01M 10/613; H01M 10/625; H01M 10/6554; H01M 10/60; H01M 10/655; H01M 10/6555;
(Continued)

(56) References Cited

U.S. PATENT DOCUMENTS 5,378,555 A * 1/1995 Waters ................. H01M 50/20
180/68.5
6,189,635 B1 * 2/2001 Schuler ................. B60R 16/04
180/68.5
(Continued)

FOREIGN PATENT DOCUMENTS

CN 206976433 U 2/2018
CN 207282569 U 4/2018
CN 208111534 U 11/2018

OTHER PUBLICATIONS

USPTO. Office Action relating to U.S. Appl. No. 16/814,527, dated Jul. 13, 2022.
(Continued)

*Primary Examiner* — James M Dolak
(74) *Attorney, Agent, or Firm* — Honigman LLP; Grant Griffith; Thomas Appledorn

(57) ABSTRACT

A vehicle battery assembly having a battery stack that includes a plurality of modules. The plurality of modules fastened by vertical and horizontal bolts. The battery stack includes cooling plates that is configured to be flexible and non-rigid placed between the modules. The cooling plates have improved isolation of structural stresses from the battery assembly.

18 Claims, 14 Drawing Sheets

(51) Int. Cl.
*B60L 58/26* (2019.01)
*H01M 10/613* (2014.01)
*H01M 10/625* (2014.01)
*H01M 10/6554* (2014.01)

(52) U.S. Cl.
CPC ....... *H01M 10/6554* (2015.04); *H01M 50/20* (2021.01); *H01M 2220/20* (2013.01)

(58) Field of Classification Search
CPC .......... B60K 11/02; B60K 11/00; B60K 1/04; B60K 1/00; B60K 2001/005; B60K 2001/0427; B60K 2001/003; B60L 58/26; B60L 58/10; B60L 58/24; B60L 50/66; B60L 50/00; B60L 50/64; B60L 50/50; B60L 50/60
See application file for complete search history.

(56) References Cited

U.S. PATENT DOCUMENTS

| | | | | |
|---|---|---|---|---|
| 6,211,646 | B1 * | 4/2001 | Kouzu | H01M 10/652 |
| | | | | 429/99 |
| 6,622,809 | B2 * | 9/2003 | Takahashi | B60K 6/405 |
| | | | | 903/952 |
| 6,632,560 | B1 * | 10/2003 | Zhou | H01M 50/289 |
| | | | | 180/68.5 |
| 7,905,308 | B2 * | 3/2011 | Abe | H01M 10/6565 |
| | | | | 180/68.5 |
| 7,955,729 | B2 * | 6/2011 | Onuki | H01M 10/0481 |
| | | | | 429/153 |
| 8,076,020 | B2 * | 12/2011 | Goto | H01M 10/652 |
| | | | | 429/129 |
| 8,322,476 | B2 | 12/2012 | Komaki | |
| 8,551,640 | B2 * | 10/2013 | Hedrich | H01M 10/6557 |
| | | | | 429/158 |
| 8,603,663 | B2 * | 12/2013 | Park | H01M 50/298 |
| | | | | 429/178 |
| 8,795,867 | B2 * | 8/2014 | Kim | H01M 10/625 |
| | | | | 248/500 |
| 9,156,341 | B2 | 10/2015 | Matsumura et al. | |
| 9,236,590 | B2 * | 1/2016 | Aoki | H01M 10/643 |
| 9,368,771 | B2 * | 6/2016 | Seto | H01M 50/30 |
| 9,450,219 | B2 * | 9/2016 | Kim | H01M 50/291 |
| 9,461,285 | B2 * | 10/2016 | Klausmann | H01M 10/6555 |
| 9,543,556 | B2 * | 1/2017 | Boddakayala | H01M 10/647 |
| 9,748,538 | B2 | 8/2017 | Fritz et al. | |
| 9,818,994 | B2 * | 11/2017 | Andre | B60K 1/04 |
| 9,882,178 | B2 * | 1/2018 | Kim | H01M 10/625 |
| 9,905,823 | B2 * | 2/2018 | Maeda | H01M 50/20 |
| 10,115,941 | B2 * | 10/2018 | Rüter | H01M 50/20 |
| 10,388,923 | B2 * | 8/2019 | Takahashi | H01M 50/262 |
| 10,424,820 | B2 * | 9/2019 | Kim | H01M 10/625 |
| 10,493,837 | B1 * | 12/2019 | Angelo | B60L 50/66 |
| 10,547,093 | B2 * | 1/2020 | Kim | H01M 10/613 |
| 10,553,909 | B2 * | 2/2020 | Kobayashi | H01M 10/281 |
| 10,644,365 | B2 * | 5/2020 | Kimura | H01M 10/615 |
| 10,720,678 | B2 * | 7/2020 | Kim | H01M 10/613 |
| 11,186,183 | B2 | 11/2021 | Frost et al. | |
| 11,189,876 | B2 * | 11/2021 | Lee | H01M 50/291 |
| 11,220,169 | B2 | 1/2022 | Favaretto | |
| 11,228,070 | B2 * | 1/2022 | Probert | H01M 10/6554 |
| 11,230,177 | B2 | 1/2022 | Kim et al. | |
| 11,283,100 | B2 * | 3/2022 | Miyoshi | H01M 10/655 |
| 11,283,118 | B2 | 3/2022 | Yoo et al. | |
| 11,283,121 | B1 | 3/2022 | Boecker et al. | |
| 11,296,364 | B2 | 4/2022 | Von Hofen et al. | |
| 11,296,382 | B2 | 4/2022 | Loacker | |
| 11,335,963 | B2 | 5/2022 | Negrete et al. | |
| 11,355,800 | B2 | 6/2022 | Shimizu et al. | |
| 11,362,392 | B2 | 6/2022 | Wang et al. | |
| 11,380,948 | B2 | 7/2022 | Shimizu et al. | |
| 11,380,956 | B2 | 7/2022 | Kakimura | |
| 11,380,958 | B2 | 7/2022 | Farha et al. | |
| 11,387,482 | B2 * | 7/2022 | Aikata | H01M 50/54 |
| 11,390,175 | B2 | 7/2022 | Janzen et al. | |
| 11,437,676 | B2 | 9/2022 | Yoneyama | |
| 11,462,793 | B2 | 10/2022 | Kagami et al. | |
| 11,476,530 | B2 * | 10/2022 | Ramadan | B60K 1/04 |
| 11,588,199 | B2 * | 2/2023 | Ramadan | B60L 50/66 |
| 11,621,452 | B2 * | 4/2023 | Lee | H01M 50/242 |
| | | | | 429/99 |
| 11,742,533 | B2 * | 8/2023 | Tucker | H01M 10/643 |
| | | | | 429/120 |
| 11,923,555 | B2 * | 3/2024 | Kurihara | H01M 50/293 |
| 11,949,077 | B2 * | 4/2024 | Park | H01M 10/6554 |
| 11,981,227 | B2 * | 5/2024 | Landvik | B60L 53/80 |
| 11,984,573 | B2 * | 5/2024 | Chopard | H01M 10/6557 |
| 11,993,157 | B2 * | 5/2024 | Prothery | H01M 50/249 |
| 2005/0079408 | A1 * | 4/2005 | Hirano | H01M 10/613 |
| | | | | 429/174 |
| 2011/0165451 | A1 * | 7/2011 | Kim | H01M 50/20 |
| | | | | 429/153 |
| 2013/0313030 | A1 | 11/2013 | Matsumura et al. | |
| 2019/0214690 | A1 * | 7/2019 | Haussmann | H01M 10/647 |
| 2020/0028202 | A1 | 1/2020 | Miyoshi et al. | |

OTHER PUBLICATIONS

European Patent Office, Extended European Search Report for Application 21767784.8 dated Feb. 27, 2024.

* cited by examiner

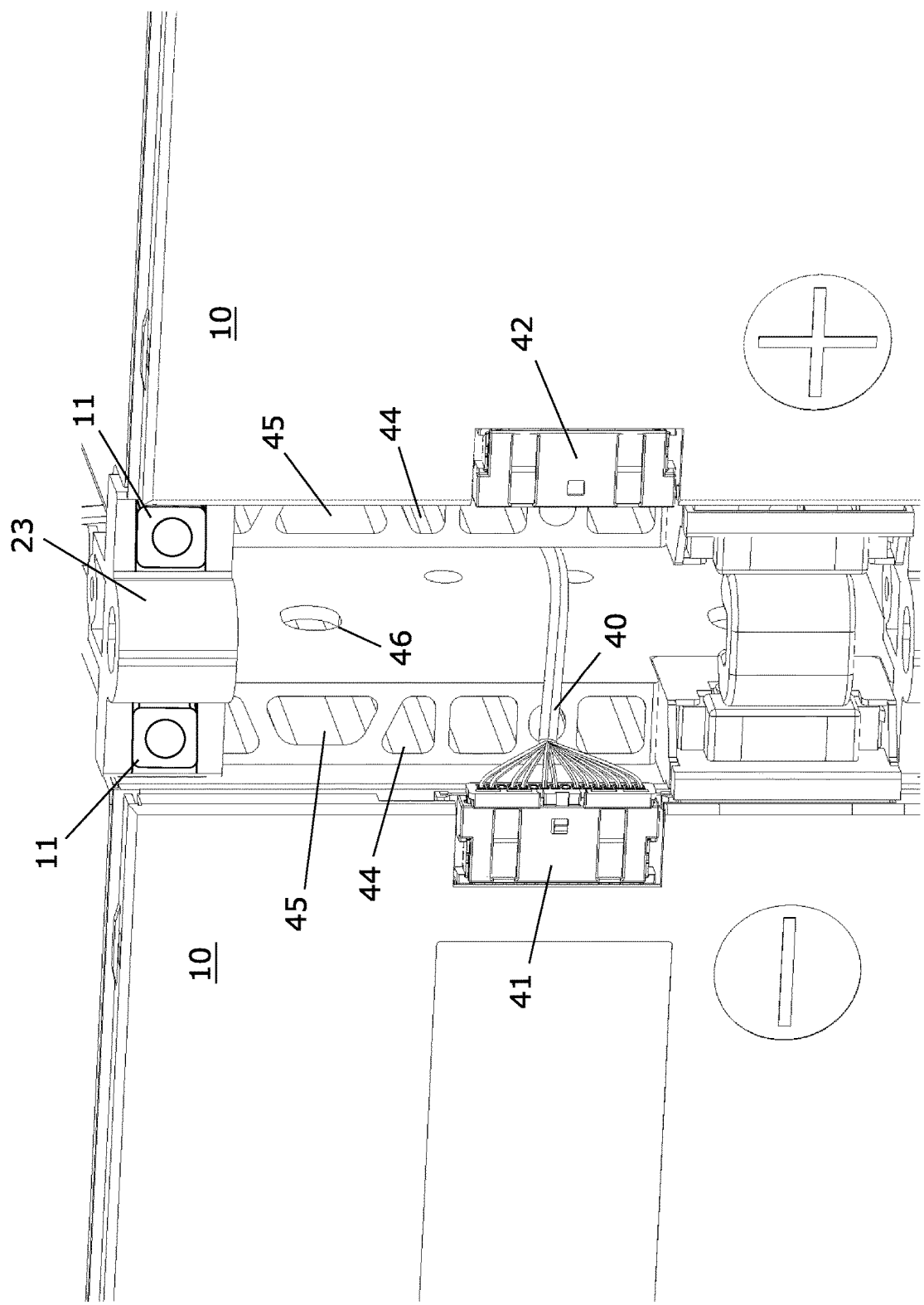

VEHICLE BATTERY SYSTEM

CROSS REFERENCE TO PRIOR APPLICATIONS

This U.S. patent application is a continuation of, and claims priority under 35 U.S.C. § 120 from, U.S. patent application Ser. No. 16/814,527, filed on Mar. 10, 2020. The disclosure of this prior application is considered part of the disclosure of this application and is hereby incorporated by reference in its entirety.

TECHNICAL FIELD

The present disclosure relates to various battery components of an electric vehicle. In particular, a battery pack, its battery modules, and organizing system.

BACKGROUND

As the transition away from fossil fuels continues, the use of all-electric and hybrid-electric motor vehicles grows ever more popular. Typically, an electric vehicle includes, a high voltage (HV) battery assembly serving as the main power source for propulsive motors driving the wheels of the vehicle. The battery assembly may include a package of battery modules. The battery assembly may be located and configured in many different ways depending on the vehicle platform. One configured includes a tunnel design in which the battery is placed under the armrest along the length of the vehicle. Furthermore, wires of the battery modules may require support to provide strain relief for the wires. A unique wire retention clip may be utilized in order to support the wires of the battery module.

The disclosed embodiments include an HV battery pack structure that fits standard VDA size battery modules and a wire retention clip that may be utilized for the wires of battery modules of the HV battery pack.

SUMMARY

An aspect of the disclosure provides a battery assembly including upper level battery modules, lower level battery modules that supports the upper level battery modules, a pillar extending from the upper level battery modules to the lower level battery modules, a vertical bolt extending through the pillar, and a horizontal bolt extending through adjacent battery modules located in the upper level battery modules.

Implementations of the disclosure may include one or more of the following optional features. In some implementations, the assembly includes a horizontal bolt anchor attached to the pillar that the horizontal bolt mounts to. In some examples, the assembly also includes a cooling plate that longitudinally extends from one end of the upper level battery modules to an opposing end of the upper level battery modules. In these examples, the cooling plate may be disposed between adjacent rows of the upper level battery modules. The assembly may additionally or alternatively include a cooling plate that longitudinally extends from one end of the lower level battery modules to an opposing end of the lower level battery modules. Here, the cooling plate is may be disposed between adjacent rows of the lower level battery modules.

In some implementations, each corresponding battery module located in the upper level battery modules includes a first electrical connector and a second electrical connector. The first electrical connector of the corresponding battery module is configured to connect to the second electrical connector of an adjacent battery module located in the upper level battery modules by a wire. Moreover, each corresponding battery module located in the lower level battery modules may include a first electrical connector and a second electrical connector. The first electrical connector of the corresponding battery module is configured to connect to the second electrical connector of an adjacent battery module located in the lower level battery modules by a wire.

In some examples, each battery module includes a plurality of battery cells. In some implementations, the assembly also includes a housing having a cover and a tray. The tray is located under the cover and supports the lower level battery modules.

Another aspect of the disclosure provides a battery assembly including upper level battery modules, lower level battery modules that support the upper level battery modules, a pillar extending from the upper level battery modules to the lower level battery modules, a vertical bolt extending through the pillar, and a horizontal bolt extending through adjacent battery modules located in the lower level battery modules.

This aspect of the disclosure may include one or more of the following optional features. In some examples, the assembly also includes horizontal bolt anchor attached to the pillar that the horizontal bolt mounts to. In some implementations, the assembly also includes a cooling plate that longitudinally extends from one end of the upper level battery modules to an opposing end of the upper level battery modules. In these implementations, the cooling plate is disposed between adjacent rows of the upper level battery modules. Additionally or alternatively, the assembly may also include a cooling plate that longitudinally extends from one end of the lower level battery modules to an opposing end of the lower level battery modules. Here, the cooling plate is disposed between adjacent rows of the lower level battery modules.

In some examples, each corresponding battery module located in the upper level battery modules includes a first electrical connector and a second electrical connector. The first electrical connector of the corresponding battery module is configured to connect to the second electrical connector of an adjacent battery module located in the upper level battery modules by a wire. Moreover, each corresponding battery module located in the lower level battery modules may include a first electrical connector and a second electrical connector. The first electrical connector of the corresponding battery module is configured to connect to the second electrical connector of an adjacent battery module located in the lower level battery modules by a wire.

In some implementations, each battery module includes a plurality of battery cells. In some examples, the assembly also includes a housing that includes a cover and a tray. The tray is located under the cover and supports the lower level battery modules.

The details of one or more implementations of the disclosure are set forth in the accompanying drawings and the description below. Other aspects, features, and advantages will be apparent from the description and drawings, and from the claims.

DESCRIPTION OF DRAWINGS

The features, aspects, and advantages of the present disclosure will become apparent from the following description, and the accompanying exemplary embodiments shown in the drawings, which are briefly described below.

FIG. 9 is a close up of the battery assembly shown in FIG. 8 without the wire retention clip.

DETAILED DESCRIPTION

According to one disclosed, a battery assembly for a vehicle is disclosed. The battery assembly includes a housing including a cover and a tray located under the cover, a battery stack including a plurality of battery modules, wherein each battery module includes a plurality of battery cells. The plurality of battery modules including upper level battery modules and lower level battery modules, wherein the lower level battery modules are configured to lie on the tray and the upper level battery modules are configured to lie on the lower level battery modules. The battery assembly further includes at least one horizontal bolt configured to extend through at least two adjacent upper level battery modules and at least one vertical bolt configured to extend through a pillar, wherein the pillar extends from said upper level battery modules to said lower level battery modules and said at least one horizontal bolt is configured to be mounted on a horizontal bolt anchor, wherein the horizontal bolt anchor is attached to and extends from the pillar.

According to another exemplary embodiment, a battery assembly for a vehicle includes a housing including a cover and a tray located under the cover configured to support a battery stack. The battery stack including a plurality of battery modules, wherein each battery module includes a plurality of battery cells. The plurality of battery modules including a first and second longitudinal row of modules, wherein each row includes an upper level and a lower level, wherein the upper level lies on top of the lower level. An upper cooling plate located between the upper level of the first and second longitudinal row of modules. A lower cooling plate located between the lower level of the first and second longitudinal row of modules. A first and second pillar located at longitudinal ends of the first longitudinal row of modules, where in the first pillar is located at the opposing end of the second pillar. A third and fourth pillar located at longitudinal ends of the second longitudinal row of modules, where in the third pillar is located at the opposing end of the fourth pillar. A plurality of horizontal bolts configured to fasten the first longitudinal row of modules to the second longitudinal row of modules. A pair of vertical bolts configured to fasten the pillar onto the tray. The first pillar including a first horizontal bolt anchor configured to receive a first horizontal bolt of the plurality of horizontal bolts. The second pillar including a second horizontal bolt anchor configured to receive at a second horizontal bolt of the plurality of horizontal bolts. The third pillar including a third horizontal bolt anchor configured to receive the first horizontal bolt and the fourth pillar including a fourth horizontal bolt anchor configured to receive at the second horizontal bolt.

Figure 1:
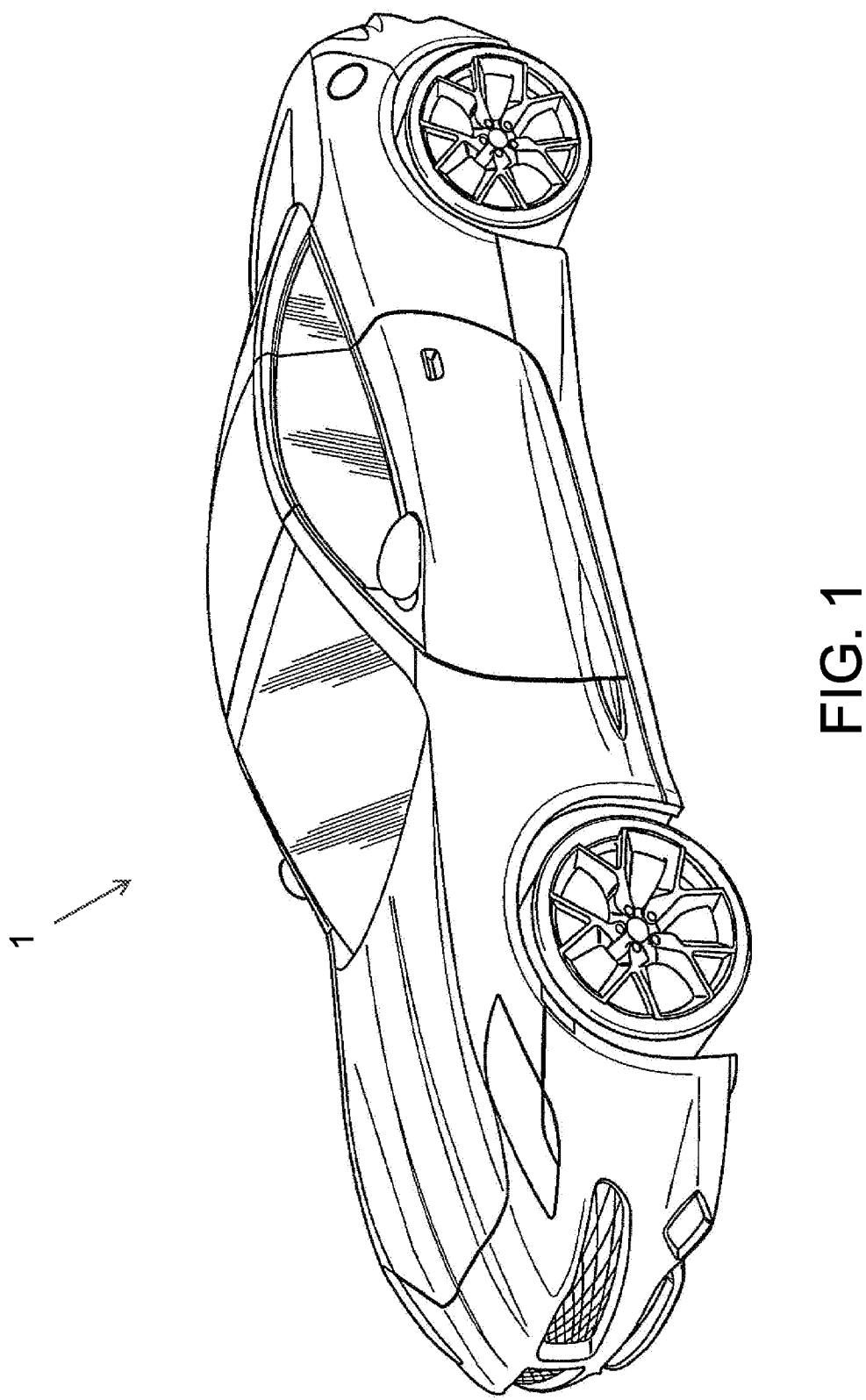
FIG. 1 is a vehicle with a battery assembly located within the vehicle.

FIG. 1 illustrates a vehicle 1 including a high voltage battery (inside the vehicle) that powers propulsive motors (not visible; inside the vehicle) that drives the wheels of the vehicle.

Figure 2:
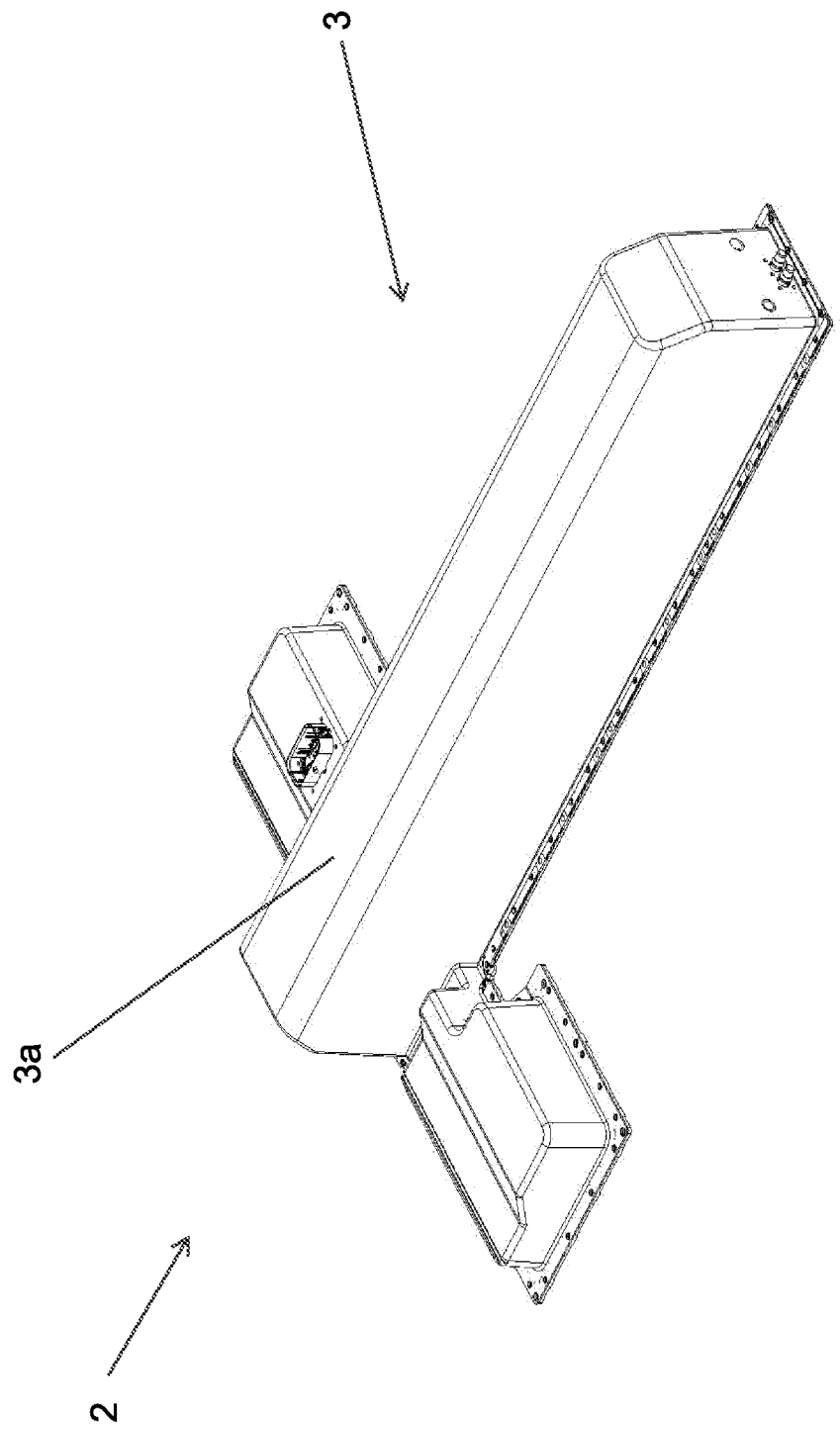
FIG. 2 is a battery assembly for the vehicle shown in FIG. 1.
Figure 3:
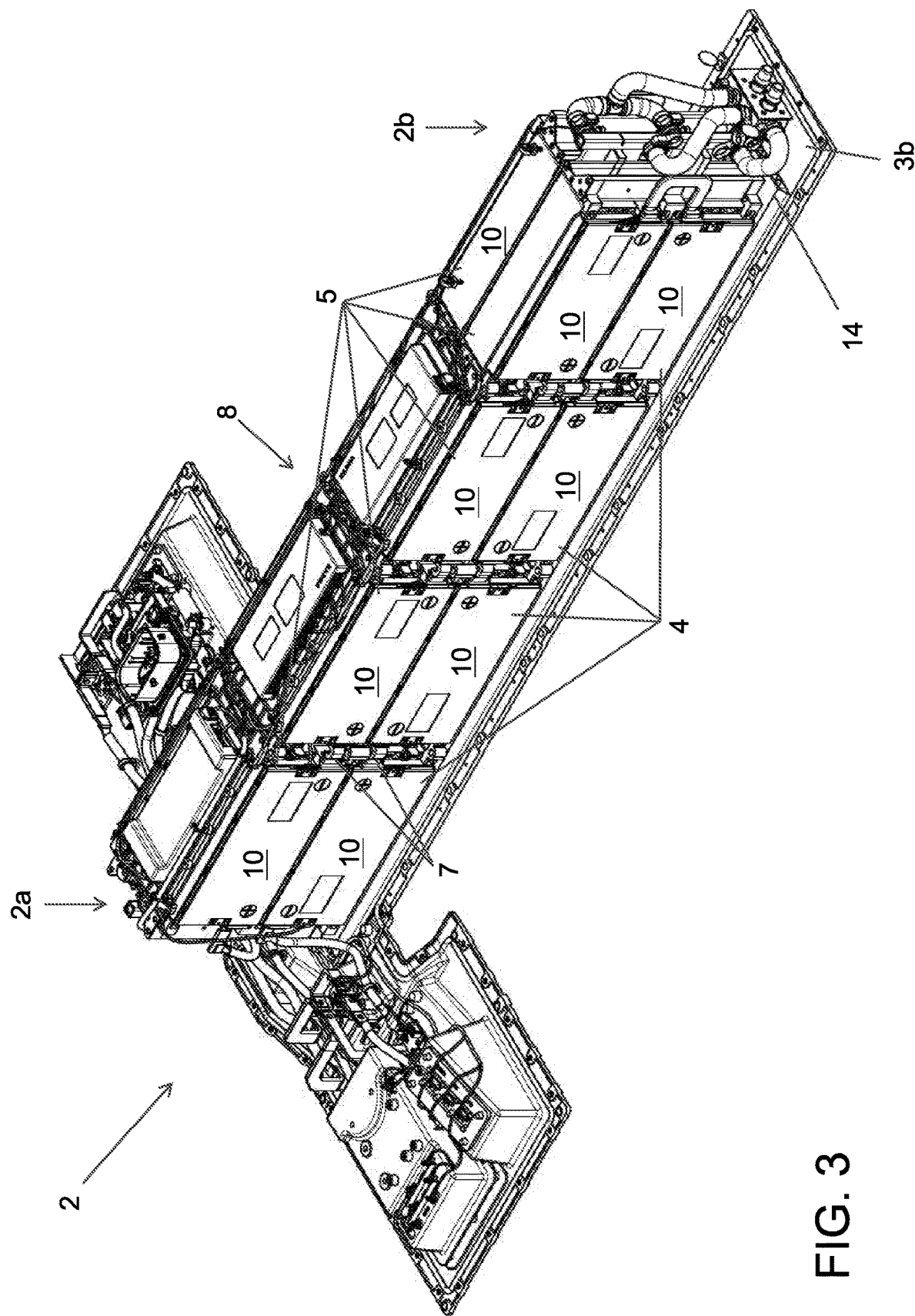
FIG. 3 is the battery assembly shown in FIG. 2 with the cover removed.

FIG. 2 is a high voltage battery assembly 2 that includes a housing 3 including cover 3a and tray 3b (see FIG. 3). The cover 3a is fastened onto tray 3b. FIG. 3 shows the battery assembly 2 with the cover 3a removed. The battery assembly 2 includes a battery stack 8 including one or more battery modules 10 disposed on top of tray 3b. The battery stack 8 extends longitudinally across the battery assembly 2. The battery stack 8 includes lower level battery modules 4 and upper level battery modules 5 (not all battery modules 10 can be seen in FIG. 3). Each battery module 10 may include one or more battery cells (not shown, inside each module). The battery stack 8 of the battery assembly 2, as shown in FIG. 3, includes sixteen modules arranged in two rows of eight battery modules 10 with each row of battery modules 10 having four columns of two modules (upper level 4 and lower level modules 5). The lower level battery modules 4 are located on top of an extrusion 14 of tray 3b and support the upper level battery modules. Each battery module 10 may be a standard size VDA battery module. The dimensions of the standard size VDA battery module is set by the German Association of the Automotive Industry, also known as Verband der Automobilindustrie (VDA). The battery modules 10 may be oriented such that the positive and negative sides of adjacent battery modules in a given row are alternating (see FIG. 3). Adjacent battery modules in a given row may be electrically connected via electric connections 7 as shown throughout the figures in the disclosure.

Figure 4A:
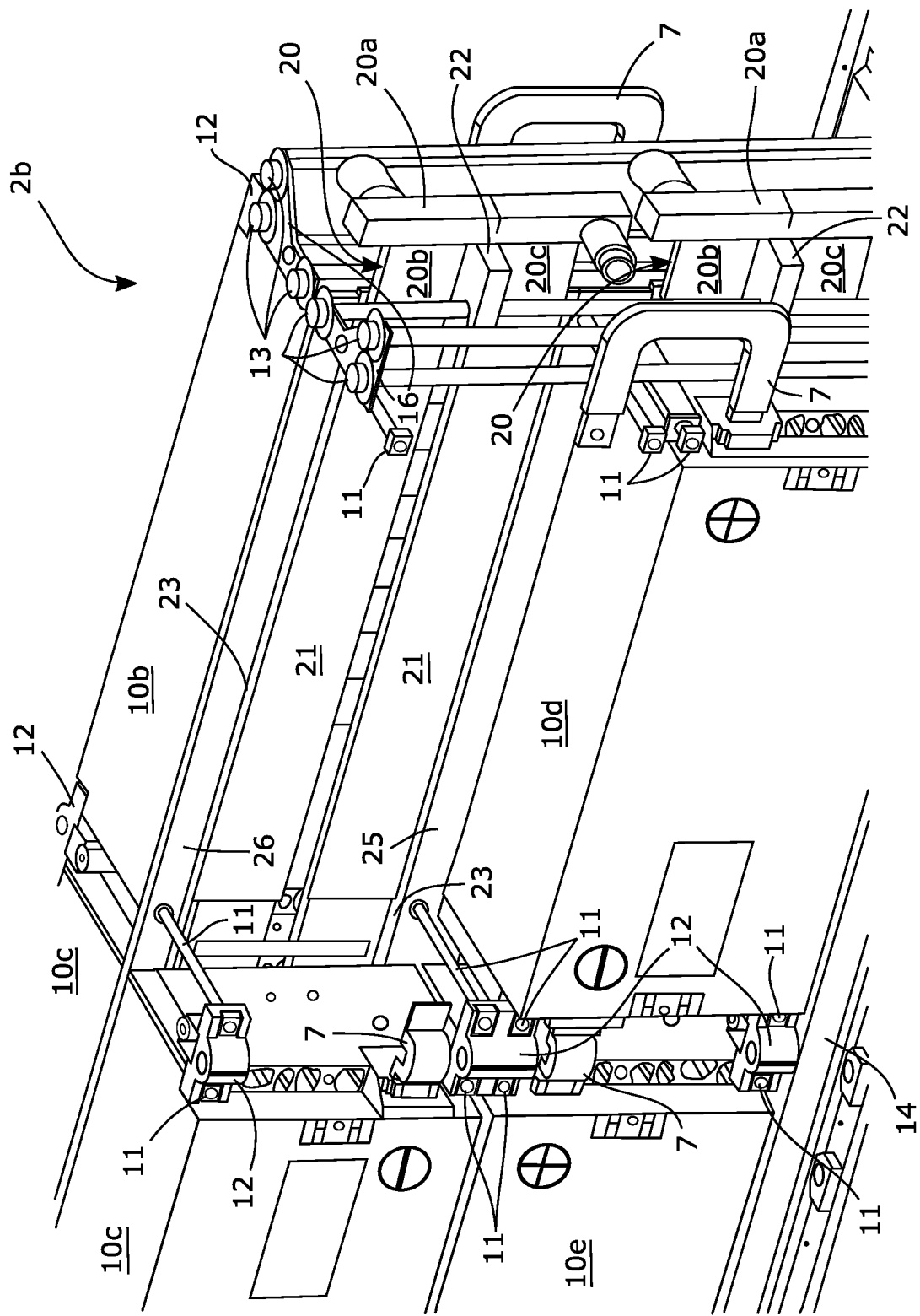
FIG. 4a is a close up of the battery assembly shown in FIG. 3 with a removed battery module.

FIG. 4a shows the battery stack 8 of the battery assembly 2 with a single battery module 10 removed. The battery modules 10 are fastened via horizontal bolts 11 that extend through the modules 10. The horizontal bolts 11 may be fastened onto corresponding horizontal bolt anchors 12 via a nut. The horizontal bolt 11 may extend through one or more battery module 10 to another horizontal bolt anchors 12 at the opposing lateral side of the battery stack 8. The horizontal bolt 11 may receive a nut 11b (see FIG. 5a) at one side so that at least two battery modules 10 may be coupled and fastened together in the lateral direction.

Figure 4B:
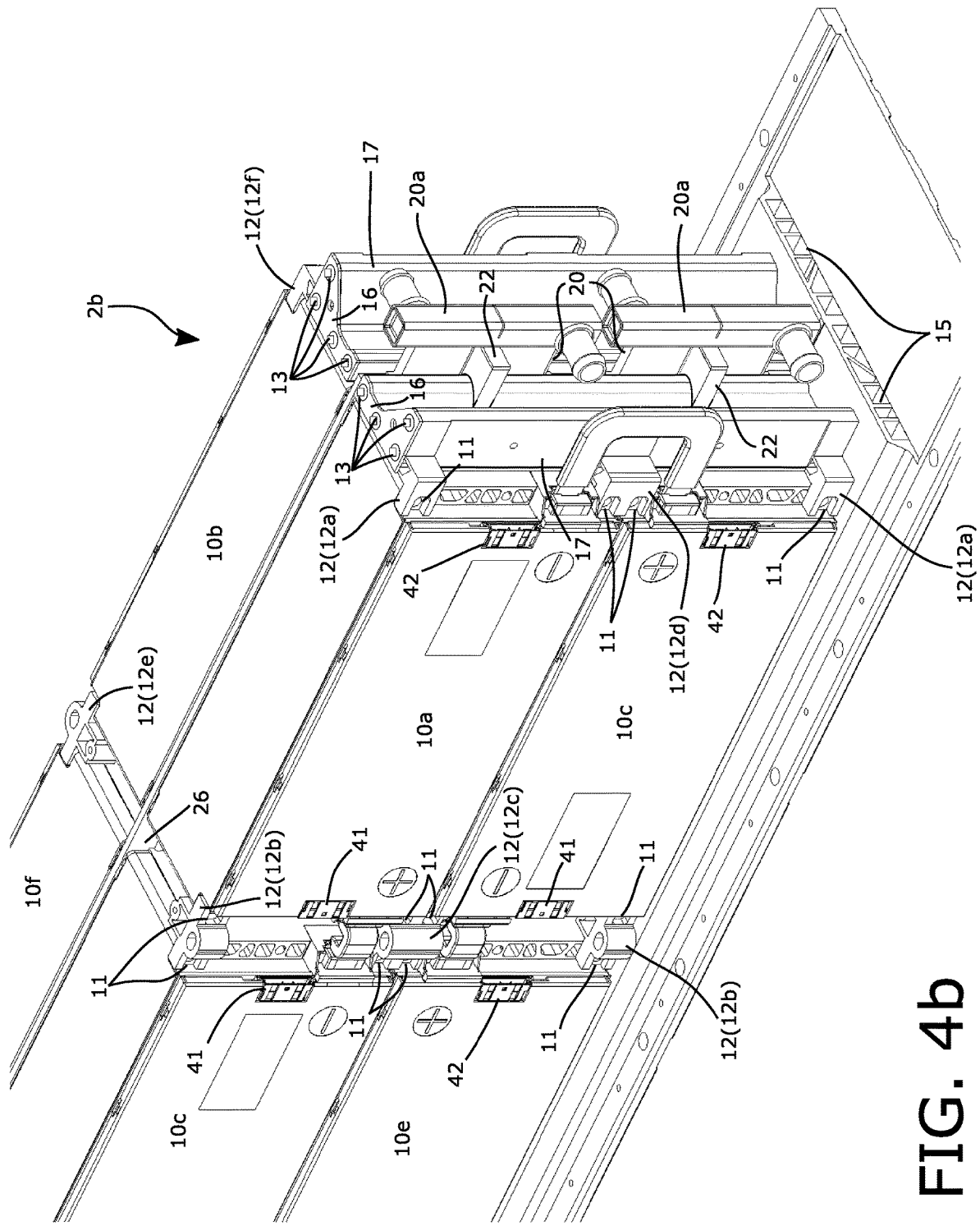
FIG. 4b is a close up of the battery assembly shown in FIG. 3.

For example, FIG. 4b shows two rows of battery modules 10 such that a pair of battery modules 10a and 10b are fastened and coupled together via horizontal bolts 11. The horizontal bolts 11 may be positioned at the top and bottom of each battery module 10, however horizontal bolts 11 may be placed and fastened at other locations along the height of the battery module. The horizontal bolt anchors 12 may include one or more openings configured to receive horizontal bolts 11. The horizontal bolt anchors 12 located at the corners of the assembly may include only one opening. For example horizontal bolt anchor 12a includes a single opening, and is positioned at the outside corners of the assembly 2 where there are no module to module connection required located at the longitudinal end 2b of the battery stack 8. Horizontal bolt anchor 12d may be placed between upper and lower level modules at the longitudinal end 2b of the battery stack 8. The bolt anchors 12 located between modules 10 are configured such that one end of the bolt anchor 12 is utilized for a different battery module 10 than the module located at the other end of the bolt anchor 12. For example, bolt anchor 12b anchors battery module 10c and battery module 10a. A similar bolt anchor 12b anchors battery module 10c to 10e. Bolt anchors 12 may also include a center bolt anchor 12c which includes four openings to accommodate four different battery modules 10. Though only the battery modules 10 at longitudinal end 2b of the battery stack 8 are shown, the configuration is similarly configured for the rest of the battery modules 10 of the battery stack 8. Each longitudinally adjacent battery modules 10 will be configured to have one or more horizontal bolt anchors 12 and corresponding horizontal bolts similarly shown in FIG. 4a and FIG. 4b.

Vertical bolts 13 may also be utilized to couple and fasten the battery modules 10 vertically. The vertical bolts 13 extend through the extrusion 14 and into channels 15 where nuts or rivet nuts (not shown) may be inserted into channels 15 of the extrusion 14 and wherein the nut is configured fasten to the vertical bolts 13. A nut insertion tool may be utilized in order to insert the nut into channel 15 and tightened to vertical bolts 13. The extrusion 14 is disposed above tray 3b. The length of the vertical bolts 13 may extends to and ends at the channels 15 of the extrusion 14 and does not extend through the tray 3b. This configuration reduces vulnerabilities of the battery assembly 2 to water ingress and other hazards by eliminating the need to provide holes for fasteners on the external part (e.g. tray 3b) of the battery assembly 2. The vertical bolts 13 may only be disposed at the ends of the battery stack 8. The vertical bolts 13 are inserted through vertical bolt anchors 16 located at the ends of upper battery modules 10a and 10b. The vertical bolt anchors 16 rests above pillars 17. The vertical bolt anchors 16 may be configured as a flat plate including one or more holes configured to receive vertical bolts 13. The vertical bolt 13 extend through pillars 17 to the channels 15 of the extrusion 14. The pillars 17 are also coupled to the horizontal bolt anchors 12 at the battery modules 10 at the longitudinal end 2b of the battery stack 8. The horizontal bolt anchors 12d/12a at the end of the pillars may be fastened or integrated to the pillar 17. The pillar 17 and the vertical bolt anchors 16 may have approximately the same cross sectional shape and size such that the perimeter of the vertical bolt anchors overlay the perimeter of the pillar. The pillars 17 may extend from top of module 10a to the bottom of module 10d (i.e. to the extrusion 14). This fastening configuration aids in the structural rigidity of the battery stack 8. While only one longitudinal end 2b of the battery stack 8 is shown, the other opposite longitudinal end 2a of the battery stack may include the same configuration.

In FIG. 4a, the battery stack 8 further includes cooling plates 20, thermal interface materials 21, pads 22, and strips 23. The cooling plates 20 extends longitudinally across the battery stack 8 from one longitudinal end 2b to the other longitudinal end 2a. The cooling plates 20 are configured to dissipate heat from the battery modules 10. The upper level battery modules and lower level modules may each comprise a corresponding cooling plate 20. The cooling plate 20 is not rigidly fixed to the battery modules 10 of the battery assembly 2 or the battery stack 8. This arrangement prevents structural stresses from being transmitted to the cooling plate 20, thus improving the life and durability of the cooling plate 20.

Figure 5A:
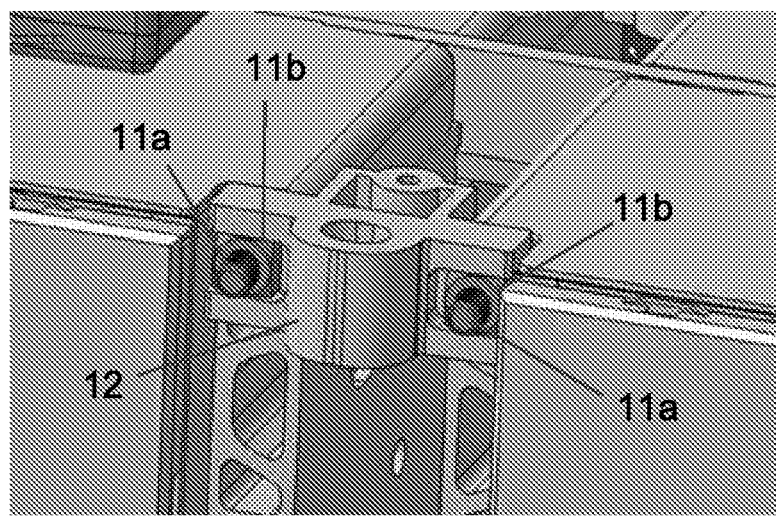
FIG. 5a is a close up of an horizontal bolt anchor.
Figure 5B:
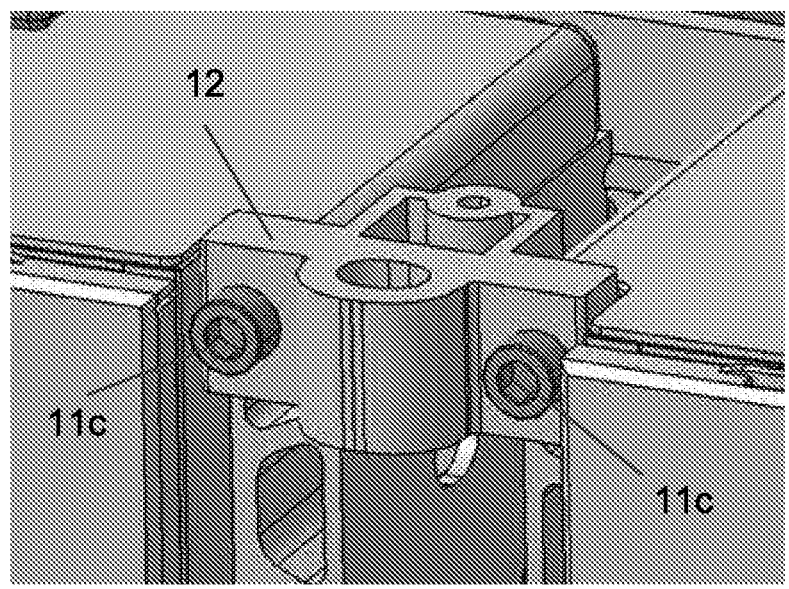
FIG. 5b is another close up of the horizontal bolt anchor.

FIG. 5a shows one side of the battery stack 8 where the horizontal bolt end 11a is inserted through the bolt anchor 12b. A square nut 11b may be placed in a slot 50 of the bolt anchor 12. The square nut 11b is inserted into the slot 50 prior to the installation of the horizontal bolt 11. FIG. 5a shows the bolt anchor 12e as seen in FIG. 4b. Bolt anchor 12e is located on the opposite side of the battery stack to bolt anchor 12b. Bolt anchor 12e includes a flat surface 51 configured to engage bolt head 11c. The bolt end 11a of horizontal bolt 11 is configured to be enter through bolt anchor 12e first and exit through bolt anchor 12b as shown in FIGS. 5a and 5b. The horizontal bolt 11 may then be tightened to the bolt anchor 12e to engage bolt anchor surface 51 and screwed through the square nut 11b. Although only top anchors 12b and 12e are shown, similar configurations of the bolt anchors 12 may be provided for the battery stack 8. For example, in FIG. 4b, each bolt anchor 12b/12c/12a may include a slot 50 configured to receive corresponding bolt ends 11a and corresponding square nuts 11b. Although a square shape nut 11b and slot 50 are shown, any shaped nut or slot be utilized.

Figure 5C:
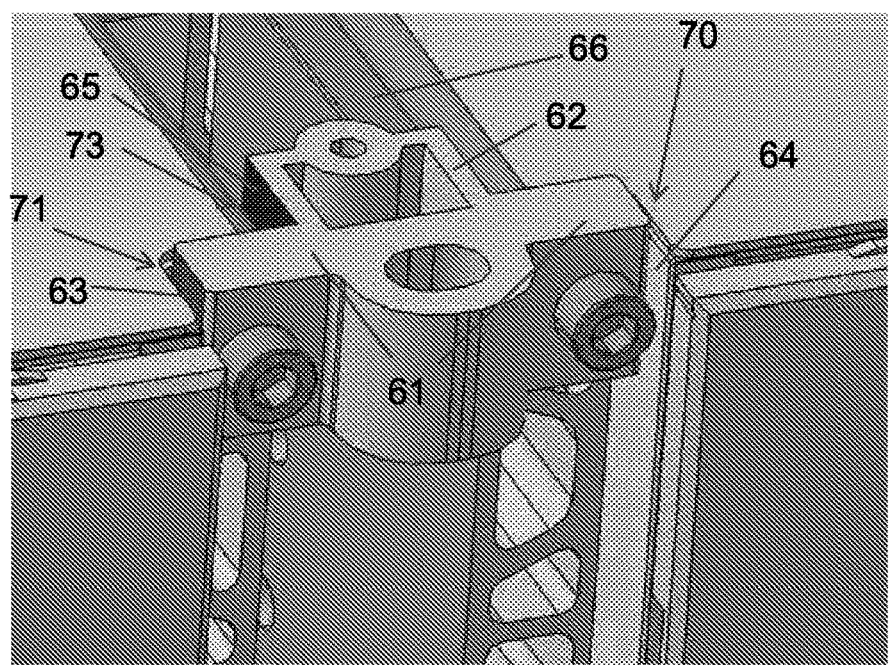
FIG. 5c is a side close up of the horizontal bolt anchor.
Figure 5D:
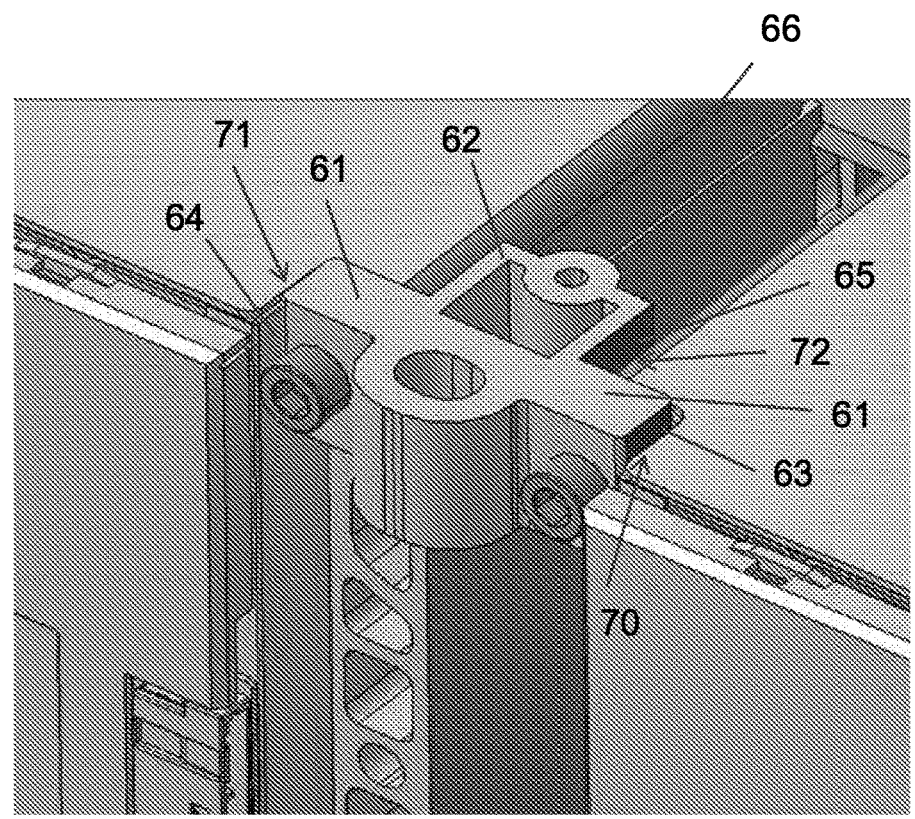
FIG. 5d is an alternate side close up of the horizontal bolt anchor.

FIGS. 5c and 5d each show an alternative view the bolt anchor 12. Each bolt anchor 12 includes a flange portion 61 and a body 62. First gaps 70/71 are located between first surfaces 63 of the flange portion 61 and first surfaces 64 of the corresponding closest adjacent battery module 10. Second gaps 72/73 are located between first surfaces 65 of the body 62 and second surfaces 66 of the corresponding closest adjacent battery module 10. The bolt anchors 12 are designed such that the second gaps 72/73 are smaller than the first gaps 70/71 on the same corresponding side (i.e. gap 70 is smaller than gap 72 and gap 71 is smaller gap 73). This configuration protects the battery modules 10 from unwanted contact at the first surfaces 64 which may electrically damage the battery cells. In a situation where the horizontal bolts 11 are loose, the body 62 will contact second surfaces 66 and the flange portions 61 are prevented from touching the first surfaces 64.

Figure 5E:
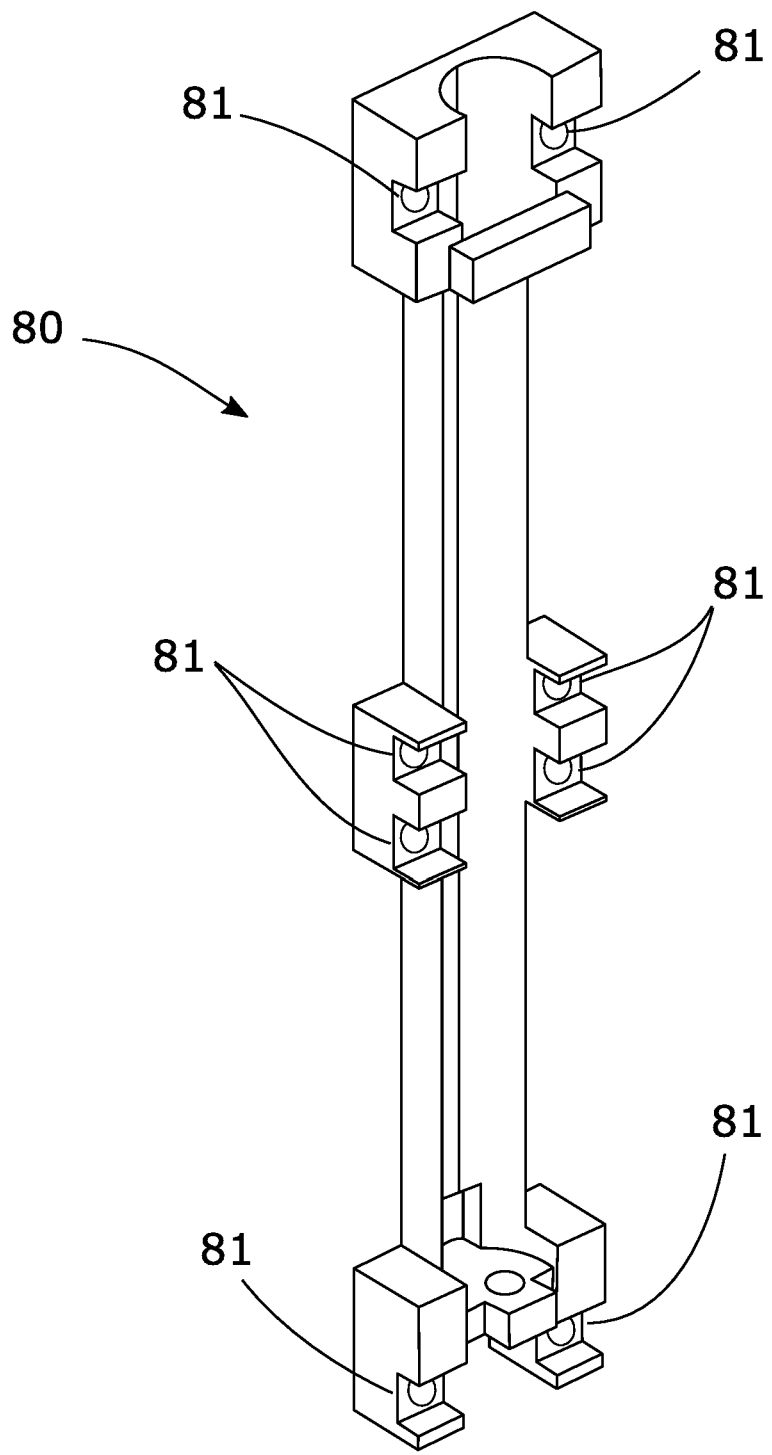
FIG. 5e is a nut mounting tool for the horizontal bolt anchor.

FIG. 5e shows a nut assembly or mounting tool 80 for the battery stack 8. The tool 80 eliminates the need for a second operator to be involved in the installation of the horizontal bolts 11. Mounting tool 80 is configured to attach to the anchors 12 at the bolt end side. The mounting tool 80 is configured to hold corresponding square nuts 11b at nut slots 81. The location of the nut slots 81 corresponds to the location of slots 50 of the bolt anchors 12 where nut 11b is configured to be placed inside. As the horizontal bolts 11 are inserted and tightened from the bolt anchors 12 of the opposite side (i.e. bolt heat side), the bolts 11 will catch corresponding nuts 11b and carry the bolts into the corresponding slots 50 of the horizontal bolt anchors 12 via the threads of the bolt 11. The shape of the nut assembly tool 80 may conform to the shape of the bolt anchors so that the nuts 11b may be transferred smoothly from the slots 81 of the assembly tool 80 to the slots 50 of the bolt anchors 12 (i.e., no gap exists between the tool 80 and the corresponding anchors 12).

Figure 6:
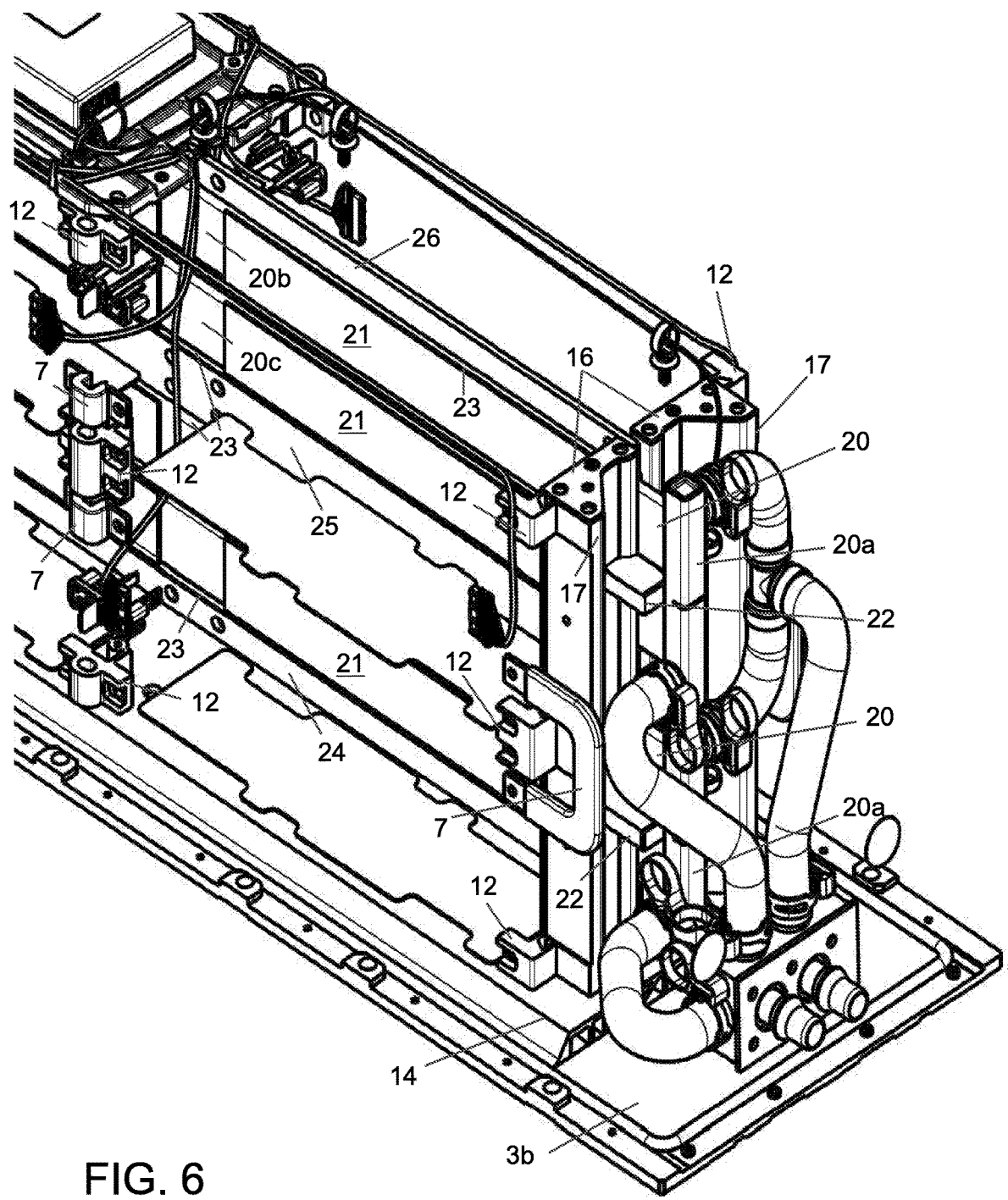
FIG. 6 is a close up of the battery assembly shown in FIG. 3 with all modules removed.

FIG. 6 shows the battery stack 8 without the battery modules 10. Horizontal fasteners 11 and vertical fasteners 13 are also omitted. The battery stack 8 further includes a bottom supporting plate 24, an intermediate supporting plate 25, and a top supporting plate 26. The top supporting plate 26 may also be seen in FIG. 4a and FIG. 4b and the intermediate supporting plate 25 may also be seen in FIG. 4a. Supporting plates 24/25/26 run parallel with the cooling plates 20. Strips 23 run along the length of the supporting plates 24/25/26 and are placed between the cooling plates 20 and corresponding adjacent supporting plates 24/25/26. The supporting plates 24/25/26 are configured to receive and support the horizontal bolts 11. The supporting plates 24/25/26 are located between the rows of battery modules 10, wherein the rows are the set of upper and lower battery modules arranged longitudinally along the battery stack 8.

Cooling plates 20 may include heat sink pipes 20a configured to receive and carry a cooling medium. Segments of thermal interface material 21 may be applied onto both sides the cooling plate 20 facing the battery modules 10. The thermal interface material 21 is configured to enhance thermal coupling of the cooling plate 20 and the battery modules 10 in order to quickly dissipate heat away from the battery modules 10 to the cooling medium. The strips 23 are placed between corresponding adjacent supporting plates 24/25/26 and cooling plates 20. The strips 23 may be made of foam, and configured to support the cooling plates 20 in the vertical direction. The pad 22 is placed between rails 20b and 20c of the cooling plates 20 and configured to engage the pillars 17 and heat sink pipe 20a of the cooling plate 20 such that the pad 22 prevents the cooling plate 20 from moving in the longitudinal direction along the battery stack 8 (see FIG. 4b and FIG. 6). Although not shown, the configuration of pad 22 may also be applied to the other longitudinal end 2a of the battery stack 8. The pad 22 may also comprise foam material of suitable thickness and resiliency. In the configuration described above, the cooling plates 20 are not screwed or bolted onto the battery stack 8. As a result, the cooling plates 20 are relieved of structural stresses thus improving the life cycle of the plates.

Figure 7:
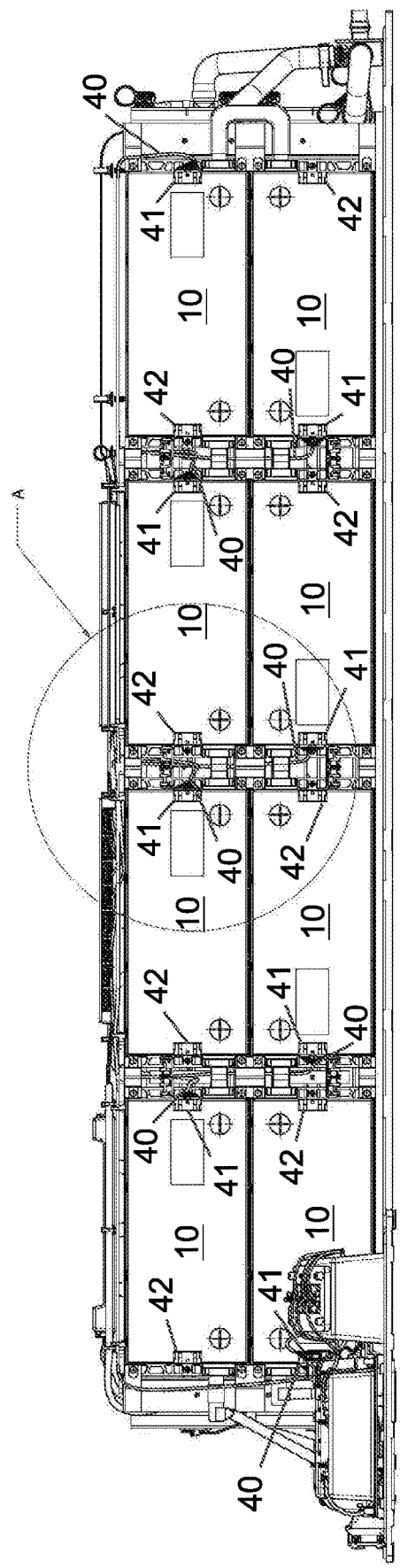
FIG. 7 is a side view of the battery assembly shown in FIG. 3.
Figure 8:
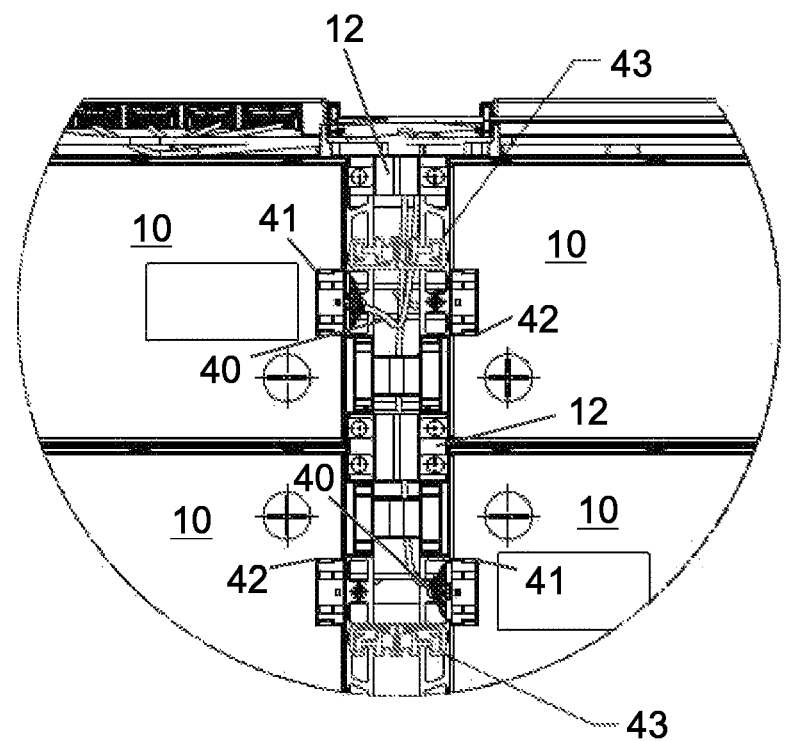
FIG. 8 is a close up of encircled portion 'A' shown in FIG. 7.
Figure 10A:
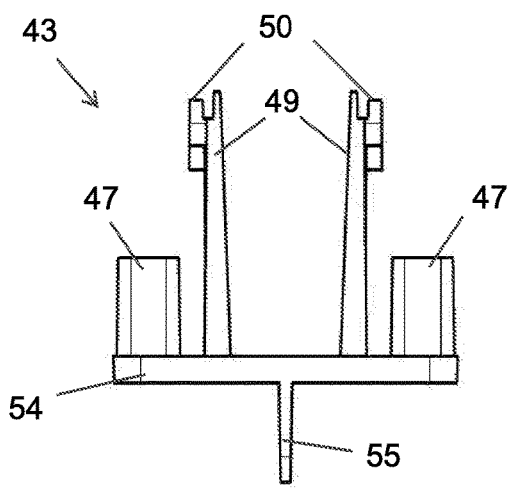
FIG. 10a is a bottom view of the wire retention clip.
Figure 10B:
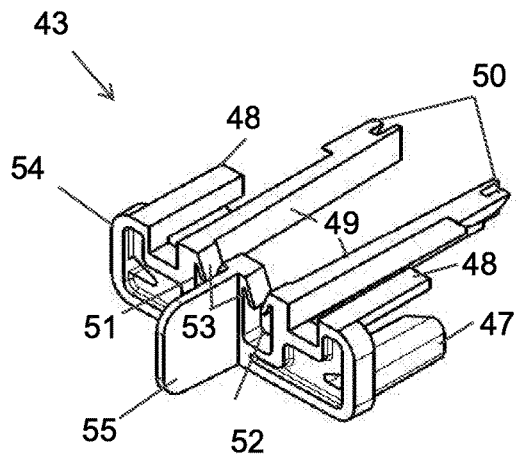
FIG. 10b is an isometric view of the wire retention clip.
Figure 10C:
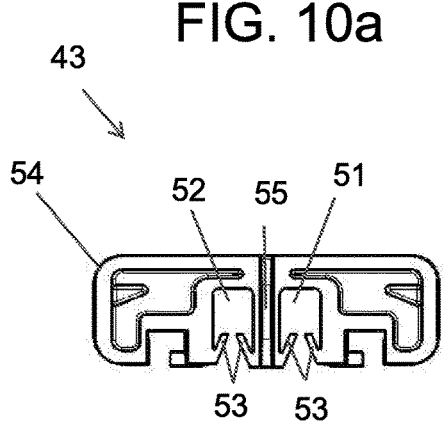
FIG. 10c is a rear view of the wire retention clip
Figure 10D:
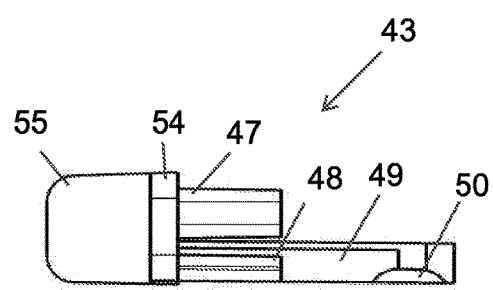
FIG. 10d is a side view of the wire retention clip.

As shown in FIG. 7 the battery stack 8 may also include one or more wires 40 configured to connect to each battery module 10. Each battery module 10 includes a first connector 41 and a second connector 42. Each connector is configured to receive and send data from the battery ECU and other electronic devices in the battery assembly 2 to each battery module 10. The wires 40 may be required to be connected to a single side. For example, the wires 40 may be required to be connected to the connector 41 at the negative side of the battery module 10. To prevent insertion of the wires to the wrong connectors, a wire retention clip 43 is provided to organize and support the wires 40. The wire may also be connected to the connector 42 at the positive side of the battery module 10 if required. As shown in FIG. 8 the wire retention clip 43 is configured to be clipped onto the modules 10 of battery assembly 2. FIG. 9 shows a close up of the battery assembly 2 between two battery modules 10 without the wire retention clip 43. The battery modules 10 may include first clip hole 44 and second clip hole 45, wherein both first and second clip holes 44/45 extends laterally at the ends of battery modules 10. The first and second clip hole 44/45 of each module is configured to receive legs of the wire retention clip 43. Each battery module 10 may also include a third clip hole 46 configured to receive a notch 50 (see FIG. 10a-10d) of the wire retention clip 43. The third clip hole 46 is located at an end face of the longitudinal end of each battery module 10. The first, second, and third holes 44, 45, and 46 are configured to receive the retention clip 43. Although only shown in one side the third hole 46 is configured to be located on both sides of each battery module 10, allowing the wire clip 43 to be attached to two corresponding adjacent battery modules 10.

Figure 11:
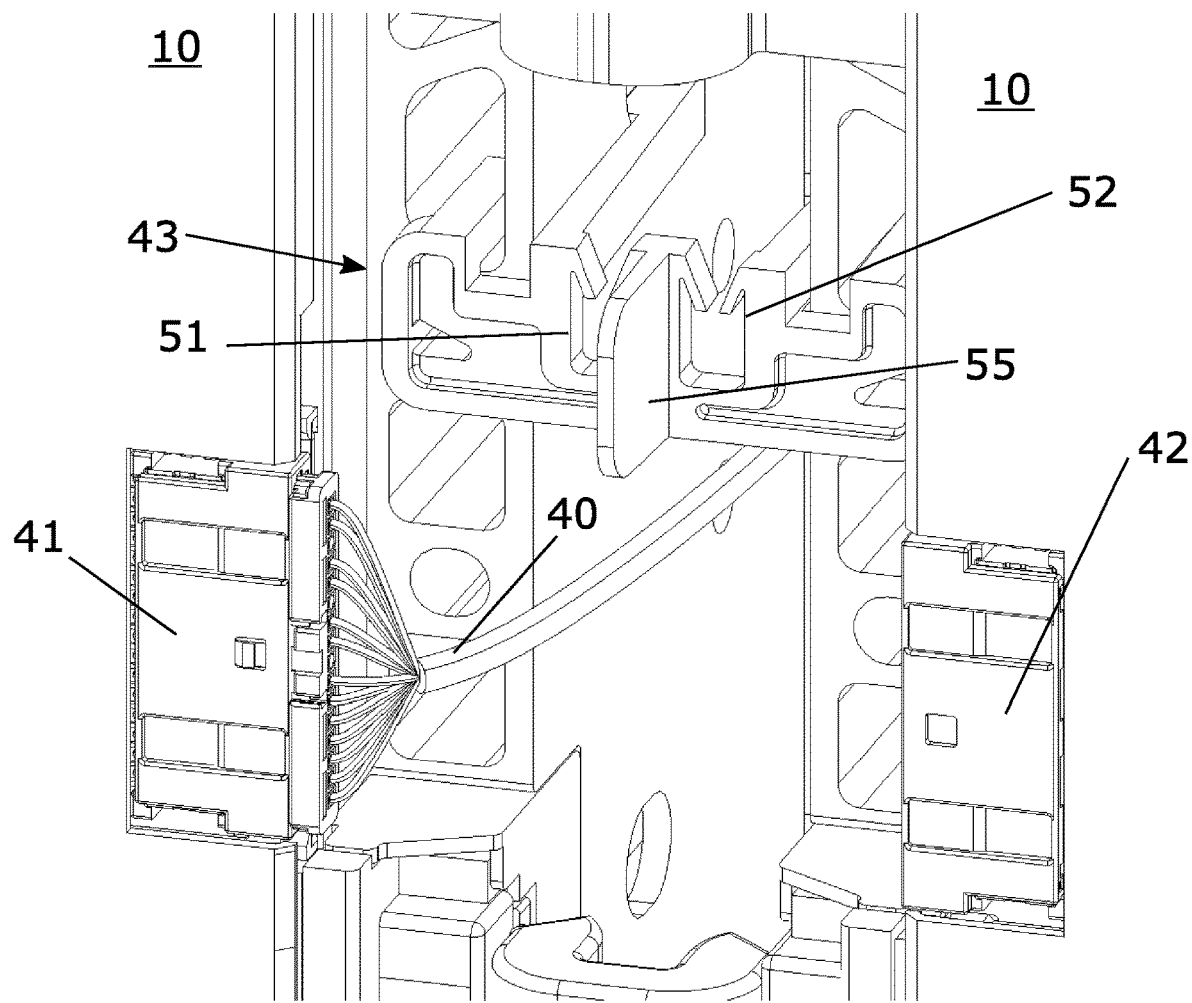
FIG. 11 is a close up of the battery assembly shown in FIG. 8.

FIG. 10a-10d shows different views of wire retention clip 43. Wire retention clip 43 may include a first pair of legs 47, a second pair of legs 48, and a third pair of legs 49 each extending from the clip main body 54. The first pair of legs 47 are shaped to be inserted to first clip holes 44 of the battery module and the second pair of legs 48 are shaped to be inserted into second clip holes 48 of the battery module. The third pair of legs 49 includes notches 50 configured to be inserted into the third clip hole 46 in respective battery modules 10. The of notches 50 and the third clip hole 46 may be any shape as long as the shape of notch 50 matches the shape of third clip hole 46. The third leg 49 is configured to be inserted into a space between battery modules. The first and second legs 47/48 hold the wire retention clip between the modules 10 via the first and second clip hole 44/45 respectively. The notch 50 is configured to clip and be inserted into the third clip hole 46. The notch 50 is configured to hold the wire retention clip 43 from being moved or pulled out of the battery modules 10. The first legs 47, second legs 48, first clip holes 44, second clip holes 45 are to be shaped such that only the first legs 47 may only be inserted into the first holes 44, and the second legs 48 may only be inserted to the second holes 45 of the battery module 10. This prevents the wire retention clip 43 from being inserted wrongly (e.g. upside-down). Wire holes 51 and 52 of the wire retention clip 43 are configured to hold the wire 40 for each corresponding battery module 10. Each wire hole 51/52 may include teeth 53 configured to allow the wire to pass in one direction while preventing the wire from exiting if pulled in the other and opposite direction. A tab 55 may also be extending from the clip main body 54. The tab 55 functions as a handle in order to aid in the insertion of the clip 43 between battery modules 10. Tab 55 also acts as a separator for the wire holes 51 and 52 so that the wires may be guided to the correct and intended module 10 for the wire. For example as shown in FIG. 11, if wire 40 is intended for connector 41, then the wire 40 will be inserted into wire hole 51. Likewise, if wire 40 is intended for connector 42 then the wire 40 will be inserted to inserted to wire hole 52. The position of the wire holes 51/52 relative to the tab 55 will bias the wire towards either the left or right battery module 10.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the battery assembly as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A battery assembly comprising:
    upper level battery modules;
    lower level battery modules, wherein the lower level battery modules support the upper level battery modules;
    a pillar extending from the upper level battery modules to the lower level battery modules;
    a vertical bolt extending through the pillar;
    a first horizontal bolt extending into and through a first top of a first one of the upper level battery modules and a second top of a second one of the upper level battery modules, the first one of the upper level battery modules located adjacent to the second one of the upper level battery modules; and
    a second horizontal bolt extending into and through a first bottom of the first one of the upper level battery modules and a second bottom of the second one of the upper level battery modules.

2. The battery assembly of claim 1, further comprising:
    a first horizontal bolt anchor attached to the pillar; and
    a second horizontal bolt anchor attached to the pillar,
    wherein the first horizontal bolt mounts onto the first horizontal bolt anchor and the second horizontal bolt mounts onto the second horizontal bolt anchor.

3. The battery assembly of claim 1, further comprising a cooling plate longitudinally extending from one end of the upper level battery modules to an opposing end of the upper level battery modules.

4. The battery assembly of claim 3, wherein the cooling plate is disposed between adjacent rows of the upper level battery modules.

5. The battery assembly of claim 1, further comprising a cooling plate longitudinally extending from one end of the lower level battery modules to an opposing end of the lower level battery modules.

6. The battery assembly of claim 5, wherein the cooling plate is disposed between adjacent rows of the lower level battery modules.

7. The battery assembly of claim 1, wherein each corresponding battery module located in the upper level battery modules comprises a first electrical connector and a second electrical connector, the first electrical connector of the corresponding battery module configured to connect to the second electrical connector of an adjacent battery module located in the upper level battery modules via a wire.

8. The battery assembly of claim 1, wherein each corresponding battery module located in the lower level battery modules comprises a first electrical connector and a second electrical connector, the first electrical connector of the corresponding battery module configured to connect to the second electrical connector of an adjacent battery module located in the lower level battery modules via a wire.

9. The battery assembly of claim 1, further comprising a housing including a cover and a tray, the tray located under the cover and supporting the lower level battery modules.

10. A battery assembly comprising:
    upper level battery modules;
    lower level battery modules, wherein the lower level battery modules support the upper level battery modules;
    a pillar extending from the upper level battery modules to the lower level battery modules;
    a vertical bolt extending through the pillar;
    a first horizontal bolt extending into and through a first top of a first one of the lower level battery modules and a second top of a second one of the lower level battery modules, the first one of the lower level battery modules located adjacent to the second one of the lower level battery modules; and
    a second horizontal bolt extending into and through a first bottom of the first one of the upper level battery modules and a second bottom of the second one of the upper level battery modules.

11. The battery assembly of claim 10, further comprising:
    a first horizontal bolt anchor attached to the pillar; and
    a second horizontal bolt anchor attached to the pillar,
    wherein the first horizontal bolt mounts onto the first horizontal bolt anchor and the second horizontal bolt mounts onto the second horizontal bolt anchor.

12. The battery assembly of claim 10, further comprising a cooling plate longitudinally extending from one end of the upper level battery modules to an opposing end of the upper level battery modules.

13. The battery assembly of claim 12, wherein the cooling plate is disposed between adjacent rows of the upper level battery modules.

14. The battery assembly of claim 10, further comprising a cooling plate longitudinally extending from one end of the lower level battery modules to an opposing end of the lower level battery modules.

15. The battery assembly of claim 14, wherein the cooling plate is disposed between adjacent rows of the lower level battery modules.

16. The battery assembly of claim 10, wherein each corresponding battery module located in the upper level battery modules comprises a first electrical connector and a second electrical connector, the first electrical connector of the corresponding battery module configured to connect to the second electrical connector of an adjacent battery module located in the upper level battery modules via a wire.

17. The battery assembly of claim 10, wherein each corresponding battery module located in the lower level battery modules comprises a first electrical connector and a second electrical connector, the first electrical connector of the corresponding battery module configured to connect to the second electrical connector of an adjacent battery module located in the lower level battery modules via a wire.

18. The battery assembly of claim 10, further comprising a housing including a cover and a tray, the tray located under the cover and supporting the lower level battery modules.

* * * * *